United States Patent

[11] 3,574,307

| | | |
|---|---|---|
| [72] | Inventor | Peter Reginald Theobald<br>Ipswich, England |
| [21] | Appl. No. | 862,366 |
| [22] | Filed | Sept. 30, 1969 |
| [45] | Patented | Apr. 13, 1971 |
| [73] | Assignee | Ransomes Sims & Jefferies Limited<br>Ipswich, Suffolk,, England |
| [32] | Priority | Oct. 4, 1968 |
| [33] | | Great Britain |
| [31] | | 47145/68 |

[54] COMBINE HARVESTERS
7 Claims, 4 Drawing Figs.

[52] U.S. Cl.................................................. 130/24,
130/27
[51] Int. Cl..................................................... A01f 12/00
[50] Field of Search.......................................... 130/24, 27,
26; 56/20, 21, (Condition Responsive)

[56] References Cited
UNITED STATES PATENTS

| 2,611,227 | 9/1952 | Keller........................... | 56/20 |
| 3,073,099 | 1/1963 | Andersen...................... | 56/20 |
| 3,470,681 | 10/1969 | Saemann...................... | 56/20 |
| 3,515,144 | 6/1970 | Morrison....................... | 130/26 |

FOREIGN PATENTS

| 234,307 | 6/1961 | Australia.... 56/Condition Responsive |
| 53,446 | 1/1967 | Germany....................... 130/24 |

*Primary Examiner*—Antonio F. Guida
*Attorney*—Ira Milton Jones

ABSTRACT: Apparatus for controlling the forward speed of a combine harvester in dependence upon grain loss at a selected location in the harvester comprises an electronic clock circuit, a delay circuit and a counting circuit, the latter having transducer means which provide pulses representative of a measure of grain loss and the arrangement being such that at a predetermined time in each clock pulse, if the counting level is other than a predetermined value the forward speed of the harvester is increased or decreased to control the level of grain loss from the harvester.

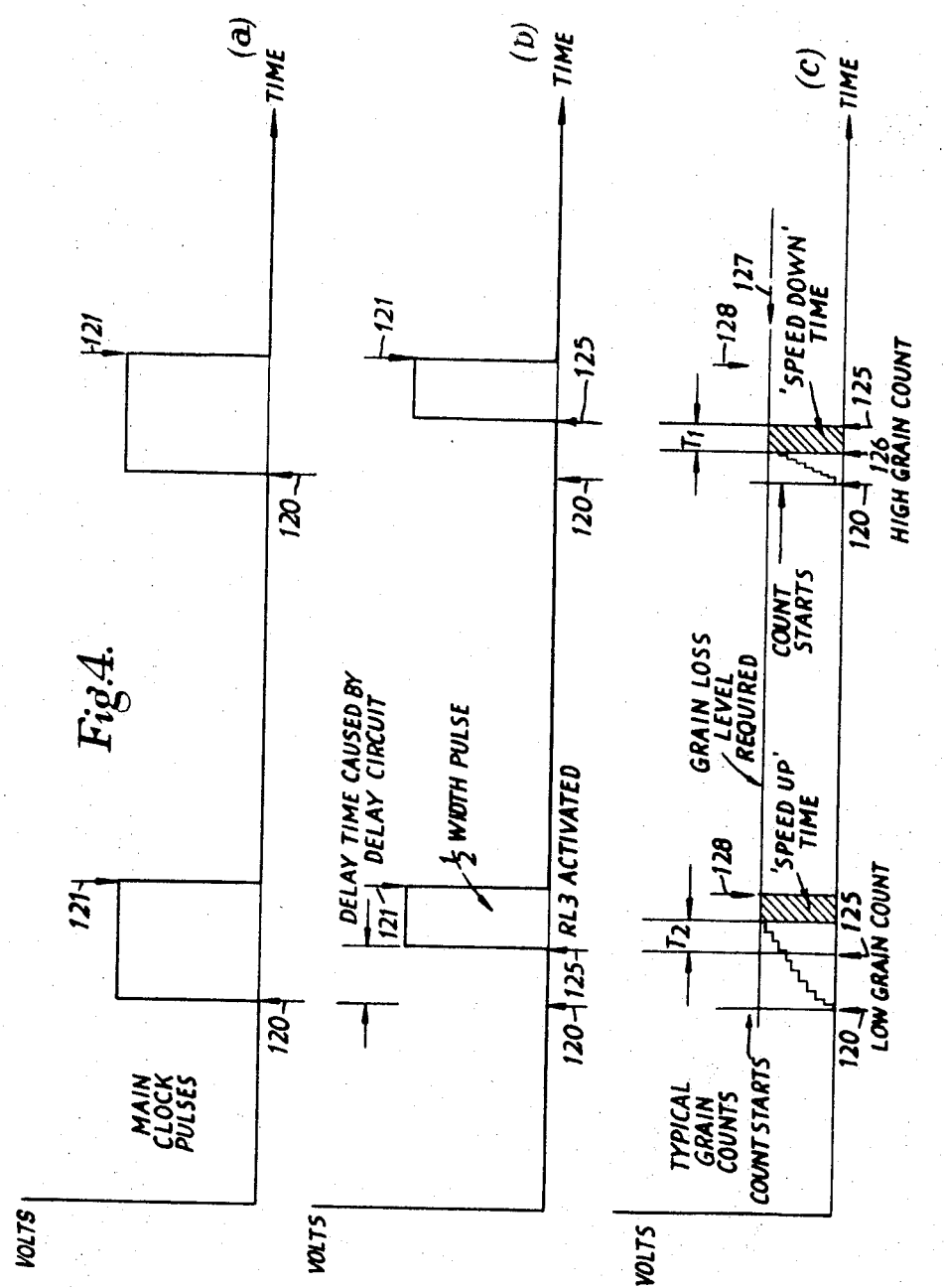

COMBINE HARVESTERS

This invention relates to combine harvesters.

A combine harvester is a most complex machine requiring considerable skill on the part of its operator to determine the optimum rate of input of crop to the machine under the widely varying conditions in which the harvester is required to operate. If the forward speed of the harvester is too high an unacceptably high loss of grain is suffered in the chaff and straw discharged to ground at the rear of the harvester whilst if the forward speed of the harvester is too low the harvester is being inefficiently utilized.

The capacity of a combine harvester is dependent upon the amount of grain which can be separated by the drum through the concave, where a large proportion of the total amount of grain separated is extracted, through the sieves in the dressing shoe and through the separating mechanism, usually of the kind known as "straw walkers" disposed rearwardly of the drum and concave. The concave has limitations as regards its grain separating capacity, if the amount of straw passing between the main cylinder and concave is excessive than a proportion of the grain will be passed on to the straw walkers and as this grain will be in excess of the normal throughput, the straw walker will not separate the total quantity and some of this grain will be discharged at the rear of the machine and fall to the ground and it will be lost.

Similarly if the throughput of the combine is in excess of its normal capacity with a higher grain to straw ratio than normal, the separation of the grain from straw may be accomplished over the straw walkers due to the straw level being within acceptable limits but extra grain will have to be separated over the dressing sieves and these then become overloaded and grain is lost to the ground.

In the present operation of combine harvesters the operator has no means of knowing the amount of grain which is being lost, except by stopping the machine and examining the ground immediately behind the combine harvester in order to assess its performance to ascertain if he is going too quickly. In the same way he has no means of knowing if the machine is being used to its effective capacity and he may be operating the machine below its best performance. The operation of the combine harvester, therefore, requires great skill by the user in order to assess the yield and condition of the crop as he is moving forward so that he adjusts its forward speed to maintain as closely as possible a constant quantity of material through the machine which will give him an ideal loss figure, this figure is considered to be between 50 and 100 lbs. an acre.

It is generally considered that the magnitude of the grain loss is an indication of the overall efficiency of the combine harvester and it is accordingly desirable to control the forward speed of the harvester in order to maintain a constant acceptable grain loss.

The present invention consists in apparatus for controlling the forward speed of a combine harvester in dependence upon the grain loss at a selected location in the harvester, comprising an electronic clock circuit which operates to provide an output of electrical pulses of constant duration at a constant frequency, a first control element in the clock circuit being adapted to be energized and deenergized upon initiation and termination respectively of each clock pulse, a delay circuit including a second control element adapted to be energized a predetermined time after initiation of each clock pulse and to be deenergized at the termination of each clock pulse, and an electronic counting circuit having transducer means for providing electrical output pulses representative of grain discharged in a sample of the grain loss at the selected location in the harvester, counting means supplied with pulses derived from the transducer output pulses and a third control element energized when the counting level in the counting means reaches a required value and deenergized upon termination of each clock pulse, the operation of the counting circuit being initiated at the commencement of each clock pulse and being adapted so that if before operation of the delay circuit to energize the second control element the counting level achieved by the counting circuit reaches the required value, the third control element is energized and effects operation of drive means to slow down the forward motion of the harvester until such time as the delay circuit causes energization of the second control means whereupon slowing down of the harvester forward speed is halted, whilst, if the required counting level is not reached before energization of the delay circuit the second control element is energized and causes speeding up of the harvester to occur until either the third control element is energized or the first control element id deenergized.

In one form of the invention the transducer is an electromechanical transducer which converts mechanical impulses caused by particulate matter including grains falling thereon into electrical impulses and discriminating means are provided which afford and output of electrical impulses from which the input pulses to the counting circuit are derived and which correspond with mechanical impulses derived from the denser particulate matter which impinges on the transducer means.

The invention will now be described, by way of example, with reference to the accompanying drawings, in which:

FIGS. 4(a) to 4(c) are graphs of voltage against time showing the operation of the clock delay and counting circuits.

Figure 1:
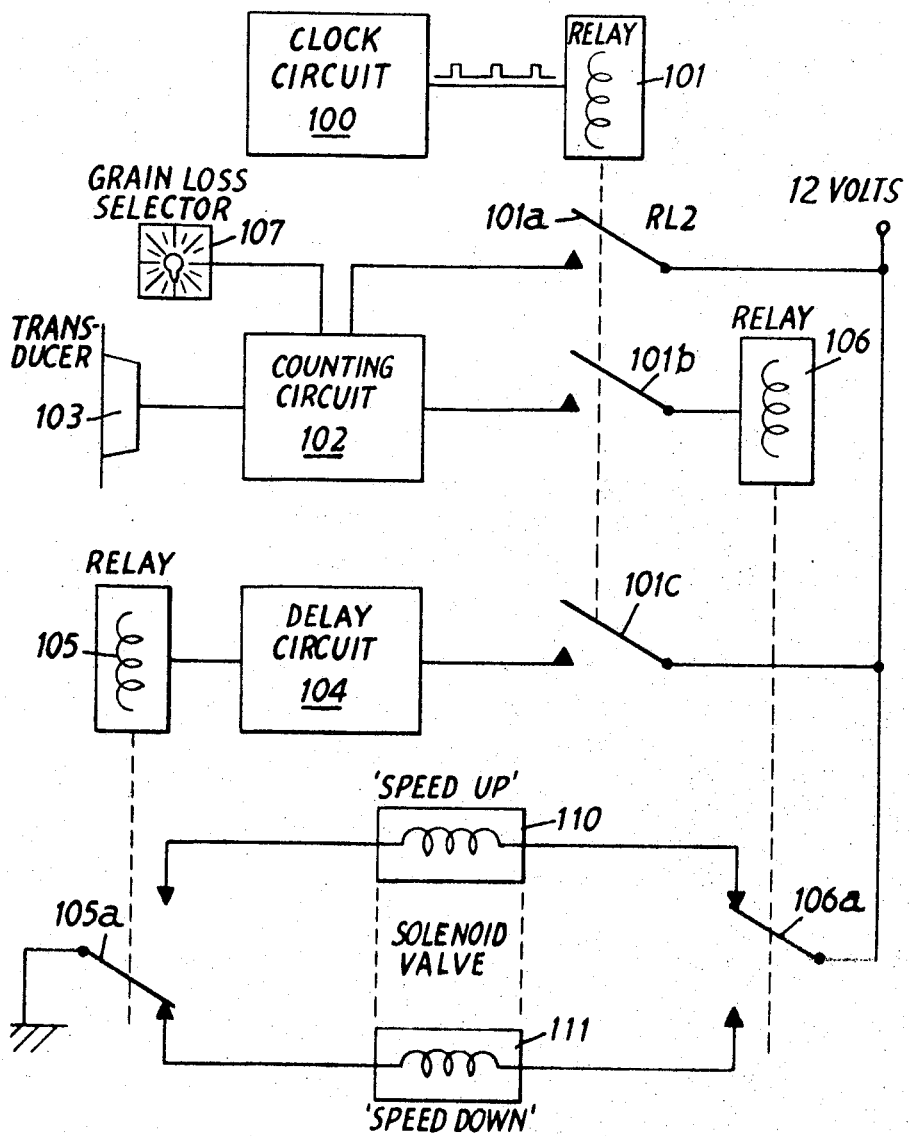
FIG. 1 is a block schematic view of apparatus, according to the invention, for controlling the forward speed of a combine harvester in dependence upon the grain loss at a selected location in the harvester.

Referring first to FIG. 1 a clock circuit 100 provides an output of pulses of constant width and constant frequency. At the commencement of each clock pulse a first control element comprising relay 101 is energized and at the termination of each clock pulse the coil of relay 101 is deenergized. With the initiation of each counting pulse there is also initiated the operation of a counting circuit 102 which includes a transducer 103 disposed in the path of grain and straw discharged over the rear end of the combine harvester straw walkers. The counting circuit 102, as hereinafter more fully described, operates to count the number of grains in a sample of the discharge from the rear end of the harvester which is caused to fall on the transducer 103. A predetermined time after initiation of a clock pulse a delay circuit 104 effects energization of a second control element consisting of relay 105. Associated with the counting circuit 102 is a third control element in the form of relay 106, energization of which occurs when the counting level in the counting circuit has reached a required value which is preset by means of a grain loss selector 107 which comprises a variable resistor.

The operation briefly is that if the grain loss is too high the counting circuit reaches its required level before the delay circuit 104 is actuated and relay 106 is energized causing energization of a solenoid 111 which operates an hydraulic valve to effect appropriate movement of a variator pulley in the harvester drive so as to cause slowing down of the harvester forward speed. The forward speed continues to be slowed down until the delay circuit is actuated whereupon relay 105 is energized and causes breaking of the circuit of solenoid 111. The variator pulley remains in its adjusted position so that forward motion of the harvester continues at the reduced speed. At the termination of the relevant clock pulse relay 101 is deenergized causing deenergization of relays 105 and 106 so that the relays are reset to their original positions and the harvester continues forward at the reduced speed. If the delay circuit 104 is actuated prior to the counting level in circuit 102 reaching its required value, relay 105 is first energized and this causes energization of a solenoid 110 which actuates an hydraulic valve to cause repositioning of the variator pulley in the harvester drive so as to effect speeding up of the harvester. Speeding up continues until the required counting level is reached, whereupon relay 106 is energized to break the circuit of solenoid 110, whereupon the variator pulley is held in its adjusted position. At the termination of the relevant clock pulse relays 101 and 105 are deenergized the deenergization of relay coil 101 causing deenergization of coil 106 so that all relays are deenergized and the circuit is ready to receive the next clock pulse. If after actuation of the delay circuit 104 the required counting level in counting circuit 102 is not reached prior to the termination of the clock pulse, coil 106 is not energized and speeding up of the harvester is maintained until the termination of the clock pulse.

Figure 2:
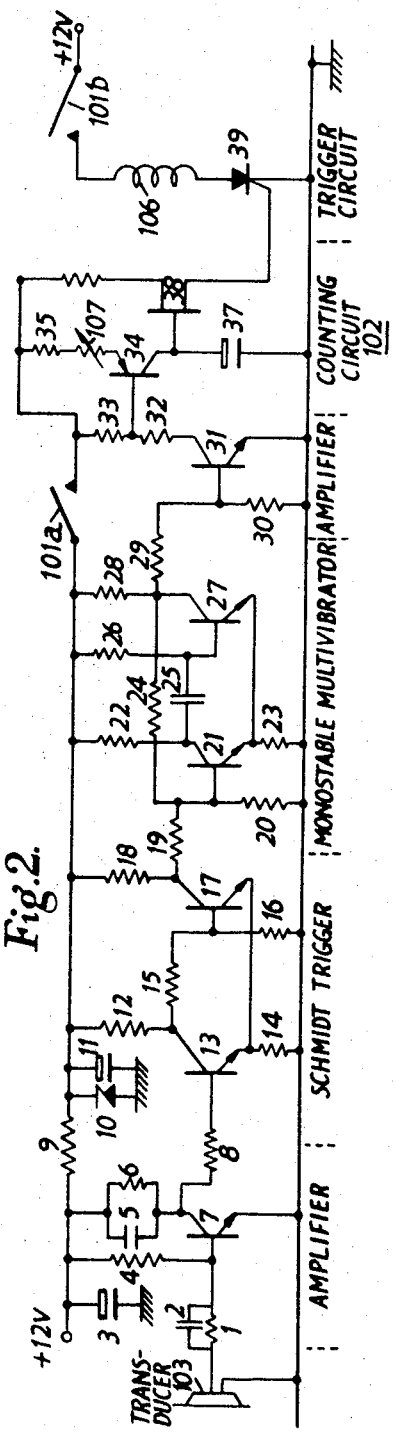
FIG. 2 is a circuit diagram of an electronic counting circuit of the apparatus of FIG. 1.
Figure 3:
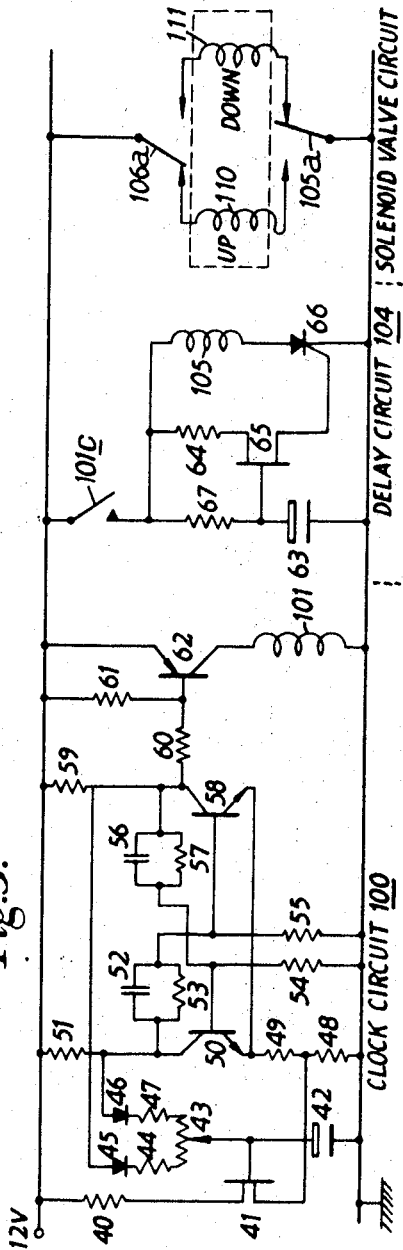
FIG. 3 is a circuit diagram of a clock circuit and delay circuit of the apparatus of FIG. 1.

Referring now to FIGS. 2 and 3 the output of transducer 103, which is a crystal microphone located beneath a plate which is placed to receive a sample of the discharge from the straw walkers, is fed by way of resistor 1 which is shunted by capacitor 2 to the base of an amplifier consisting of an NPN transistor 7, the base of which is connected by way of resistor 4 to a 12 v. line whilst the emitter is connected directly to an earth line, the transistor collector being connected to the 12 v. line via resistor 6 which is shunted by capacitor 5. The amplifier output is resistively coupled to a schmidtt trigger circuit by means of resistor 8 connected to the collector of transistor 7. The schmidtt trigger circuit comprises NPN transistor 13 and 17 connected in common emitter configuration, that is to say each of the emitters of the transistors is connected to earth via resistor 14. The collectors of the transistors 13 and 17 are connected to a stabilized voltage line by way of resistors 12 and 18 respectively and the collector of transistor 13 is connected to the base of transistor 17 by resistor 15. The stabilized voltage line is supplied from the 12 v. line via a resistor 9 which is in series with Zener diode 10, the latter being shunted by capacitor 11. The components 9 to 11 ensure that any changes in the 12 v. supply voltage are not transmitted to the component circuit elements to the right in FIG. 2 of components 9 to 11. The schmidtt trigger circuit acts as a discriminating means which allows to pass only impulses in excess of a predetermined amplitude received from the amplifier. The arrangement is accordingly such that the schmidtt trigger will only provide an output corresponding with input pulses derived from the denser particles in the discharge from the combine harvester straw walkers which impinges on the transducer 103. These denser particles are almost entirely grains, the straw particles falling on the transducer 103 giving rise to smaller amplitude impulses at the input to the schmidtt trigger circuit. The schmidtt trigger circuit squares off the impulses corresponding with the denser particles striking the transducer 103 and the output pulses of the schmidtt trigger circuit are resistively coupled by resistor 19 to the input of a monostable multivibrator consisting of components 20 to 28, components 21 and 27 being NPN transistors connected in common emitter configuration via resistor 23 to earth. The output of the monostable multivibrator is resistively coupled by resistor 29 to the input of an amplifier consisting of NPN transistor 31 to the base of which is connected resistor 29 and a resistor 30, the other side of which is connected to earth. The emitter of transistor 31 is connected directly to earth whilst its collector is connected by way of a resistor 32 to the base of a PNP transistor 34. The output pulses from the monostable multivibrator are squaresided pulses of uniform width and constant amplitude. The base of transistor 34 is thus supplied by resistor 32 with amplified output pulses of the monostable multivibrator. The base of transistor 34 is connected via resistor 33 to contacts 101a in the voltage line stabilized by the components 9 to 11. The contacts 101a are closed upon energization of relay coil 101. The emitter of transistor 34 is connected via the variable resistor 107 which constitutes the grain loss level selector and a resistor 35 to the stabilized voltage line whilst the collector of transistor 34 is connected to earth via a capacitor 37. It will be apparent, therefore, that every time an amplified output pulse from the monostable multivibrator is received at the base of transistor 34, the base of that transistor is driven negative so that the transistor conducts and charges capacitor 37 to an extend dependent upon the amplitude and duration of the pulse at the base of transistor 34. connected to the common point of the capacitor 37 and the collector of transistor 34 is the emitter of a unijunction transistor 38, one base electrode of which is connected via a resistor to be stabilized voltage line whilst the other base is connected to the gate electrode of a thyristor 39. Accordingly, once the charge level on capacitor 37, which is determined by the setting of variable resistor 107, exceeds a certain value the capacitor 37 discharges through the unijunction transistor 38 to supply a firing pulse to the gate electrode of thyristor 39. The cathode of thyristor 39 is connected to earth whilst the anode is connected in series with relay coil 106 the end of this coil remote from the thyristor 39 being connected via contacts 101b to a 12 v. supply. The contacts 101b are closed upon energization of relay coil 101. It will be apparent therefore that since the contacts 101b are closed upon the initiation of a clock pulse, energization of relay 106 by reason of the thyristor 39 being rendered conducting occurs when the charge of capacitor 37 has reached a predetermined level, this level being determined by a number of pulses which number depends upon the setting of resistor 107, each representing the falling of one grain on transducer 103, being received at the base of transistor 34.

The clock circuit 100 (see FIG. 3) comprises a multivibrator consisting of NPN transistors 50 and 58 having common connected emitters which lead via resistors 49 and 48 to earth. The collectors of transistors 50 and 58 are connected via respective resistors 51 and 59 to a 12 v. line, whilst the bases of transistor 50 and 58 are connected by respective resistors 54 and 55 to earth. Also, between the collector of transistor 50 and the base of transistor 58 is connected a parallel combination of capacitor 52 and resistor 53 and similarly between the base of transistor 50 and the collector of transistor 58 is connected a parallel combination of capacitor 56 and resistor 57. The collectors of transistors 50 and 58 connect, in the case of transistor 50 by way of diode 46 and resistor 47, and in the case of transistor 58 by way of diode 45 and resistor 44 to opposite ends of the resistor of a potentiometer 43, the latter having a slide wire connected to the emitter of unijunction transistor 41 and also to one side of a capacitor 42, the other side of which is connected to earth. One base of unijunction transistor 41 is connected to the 12 v. line via a resistor 40 whilst the other base is connected to the junction of resistors 48 and 49.

When the clock circuit is switched on, owing to unbalance in the components of the multivibrator thereof, either of transistors 50 and 58 is conducting whilst the other is nonconducting. Assuming that transistor 58 is conducting whilst transistor 50 is nonconducting capacitor 42 charges up via diode 46 and resistor 47 until the charge level on capacitor 42 reaches a certain value whereupon the capacitor is discharges through the unijunction transistor 41 so that a current pulse flows through resistor 48. During this charging and discharging of capacitor 42 diode 45 acts as a DC block. The current pulse through resistor 48 affects transistors 50 and 58 since resistor 48 is in the common emitter lead of these transistors. Transistor 50 is thus switched into conduction whilst transistor 58 is turned off. When this happens capacitor 42 charges once again but this time via diode 45 and resistor 44 (diode 46 now acting as a DC block) until discharge again occurs through resistor 48 causing transistor 58 to turn off and transistor 50 to turn on. The setting of slide wire 43, as will be apparent, determines the period of conduction and nonconduction of transistors 50 and 58. When transistor 58 conducts a clock pulse commences, which pulse is terminated when transistor 58 is switched in to a nonconducting state. The output from transistor 58 is coupled via resistor 60 to the base of PNP transistor 62, the base of this transistor being also connected to the 12 v. line via resistor 61. The emitter of transistor 62 is directly connected to the 12 v. line whilst the collector is connected via the coil of relay 101 to earth. Whenever transistor 58 conducts the base of transistor 62 is driven negative so that transistor 62 is switched into conduction thereby energizing the coil of relay 101. The coil of relay 101 when energized closes contacts 101a and 101b and also 101c, this latter contact initiating operation of delay circuit 103.

The delay circuit 104 consists of contacts 101c connected between the 12 v. supply line and one end of a resistor 67, the other end of which is connected to the emitter of unijunction transistor 65 and also to one side of a capacitor 63, the other side of which is connected to earth. One of the base electrodes of unijunction transistor 65 is connected by way of a resistor 64 to the common point of contacts 101c and resistor 67 and the other base electrode of unijunction transistor 65 is connected to the gate electrode of a thyristor 66, the cathode of which is connected to earth and the anode of which is connected to one end of relay coil 105, the other end of which is connected to the common point of contacts 101c and resistors 64 and 67. When the contacts 101c close by reason of energization of relay coil 101 capacitor 63 is charged at a rate dependent upon the time constant of the capacitor and resistor 67. When the charge on the capacitor reaches a predetermined value, the capacitor discharges through the unijunction transistor 65 thereby supplying a firing pulse to the gate electrode of thyristor 66 with the result that this thyristor is rendered conducting thereby energizing the coil of relay 105.

The energization of the relay coils 101, 105 and 106 controls the energization of solenoids 110 and 111 of solenoid actuated hydraulic valves, which valves respectively permit flow to or from a ram at one side of a variator pulley disposed in the drive to the ground wheels of the harvester Variation in the setting of the pulley varies the speed of the vehicle ground wheels. Solenoid 110 when energized adjusts the variator pulley so as to speed up the forward motion of the harvester and energization of solenoid 111 adjusts the variator pulley to slow down the forward motion of the harvester. A contact arm 106a connected to the 12 v. line when relay coil 106 is deenergized engages one end of solenoid 110 and when coil 106 is energized the contact arm 106a engages a corresponding end of solenoid 111. A contact arm 105a which is connected to earth, engages one end of solenoid 111 when relay coil 105 is deenergized and when relay coil 105 is energized the contact arm 105a connects with a corresponding end of solenoid 110. The ends of the solenoids 110, 111 which, depending upon whether coil 105 is energized or not, connect with the contact arm 105a are remote from the ends thereof which connect with contact arm 106a depending upon whether or not the coil 106 is energized The detailed operation can now be appreciated and for this purpose reference will be made to FIGS. 4(a) to 4(c) as well as the preceding FIGS. On switching on after setting variable resistor 107 to the desired acceptable loss, a train of clock pulses is generated by the clock circuit each time transistor 58 conducts. Arrows 120 indicate the position of the leading edges of the clock pulses. On turnoff of transistor 58 each clock pulse is terminated and arrows 121 indicate the trailing edges of the clock pulses, that is to say the points in time at which turnoff of transistor 58 occurs. On conduction of transistor 58 relay coil 101 is energized with the result that contacts 101a, 101b and 101c are closed. The closure of contacts 101a cause operation of the counting circuit of transistor 34 to commence and a predetermined time after the closure of contacts 101c relay coil 105 of the delay circuit is energized upon conduction of thyristor 66. The point in time at which coil 105 is energized is indicated by arrows 125.

If before coil 105 is energized in consequence of capacitor 63 having been charged to a predetermined level subsequent to closure of contacts 101c, the count of grains is too high and such that the charge of capacitor 37 reaches a level at which discharge through unijunction transistor 38 occurs, thyristor 39 is switched on and coil 106 is energized Contact arm 106a is thus caused to swing into engagement with the corresponding end of solenoid 111 with the result that that solenoid is energized and the variator pulley readjusts and the forward speed of the harvester decreases. The decrease in speed continues until capacitor 63 of the delay circuit reaches its charged level at which it discharges through unijunction transistor 65 to render thyristor 66 conducting and thereby energize coil 105. When coil 105 is energized contact arm 105a swings over to engage the contact on the corresponding end of solenoid 110 so that solenoid 111 is deenergized and the variator pulley is then held in position so that the harvester moves forward at the reduced speed atoned immediately prior to movement of contact 105a. This condition is clearly illustrated in FIG. 4(c) at the position indicated by the arrow 126 where it is apparent that the voltage on capacitor 37 has risen in "staircase" fashion to the desired level (indicated by arrow 127) before energization of coil 105 in the delay circuit, the result being that slowing down of the harvester takes place for a period of time indicated by T1 at the end of which the delay circuit operates to cause energization of coil 105. After energization of coil 105 the contact arms 106a and 105a remain in engagement respectively with ends of solenoids 111 and 110 until the clock pulse terminates whereupon coil 101 is deenergized causing opening of contacts 101a, 101b and 101c with the result that contact arms 105a and 106a return to the positions shown in FIG. 3. The opening of contact 101a enables capacitor 37 to discharge to zero the counting voltage level thereof.

If after initiation of a clock pulse and consequent closure of contacts 101a, 101b and 101c the count of grains is too low, the voltage on capacitor 37 rises in "staircase" fashion but does not reach the required level indicated by arrow 127 before energization of relay coil 105 of the delay circuit takes place. Accordingly on energization of coil 105 contact arm 105a swings over to engage solenoid coil 110 with the result that the variator pulley readjusts and speeds up the forward motion of the harvester. The voltage on capacitor 37 continues to rise until the required grain level is achieved whereupon coil 106 is energized to effect movement of contact arm 106a into engagement with solenoid 111, thus deenergizing solenoid 110 so that further increase of forward speed of the harvester ceases and the harvester continues its forward motion at the increased speed achieved at the instant of disconnection of contact arm 106a from solenoid 110. No further changes occur until the termination of the clock pulse causes opening of contacts 101a, 101b and 101c and in consequence of the deenergization thus caused of coils 105 and 106, contact arms 105a and 106a are restored to the positions shown in FIG. 3. It is apparent that the speeding up of the harvester occurs during the time interval T2.

In the event that the "staircase" rise of voltage on capacitor 37 has not reached the required level before the termination of the clock pulse, speeding up of the harvester will occur over the period of time between arrow 125 and the termination of the clock pulse. On termination of the clock pulse deenergization of coil 105 occurs (coil 106 not being energized since the voltage level on capacitor 37 did not achieve a high enough value) and contact arm 105a returns to the position shown in FIG. 3 so that all contacts are in the positions illustrated in FIGS. 2 and 3.

Whilst the transducer has been described as being placed to receive part of the discharge from the rear end of the straw walkers of the combine harvester it could equally well sample grain loss at some other locations in the harvester, for example at the rearward end of the sieves in the dressing shoe. Also, instead of discharging grain and straw straight onto the transducer, the discharge may be cleaned, for example by a blast of air from a fan or centrifugally to eliminate a certain amount of the straw, chaff and foreign matter. Although only a proportion of the grain loss is used for the purpose of controlling the forward speed of the harvester it has been found that a reliable control of the total losses is effected in this manner as the distribution of the grain across the width of the machine follows a fairly uniform pattern. It may even be possible by elimination of such matter to avoid the use of a discriminating circuit such as the schmidtt trigger described above though this is unlikely because the discriminating circuit acts not only to discriminate as between grains and straw and chaff but also to discriminate between grains and impulses arriving at the microphone, transducer by reason of random vibrations in the harvester which arise in consequence of its forward motion.

Those skilled in the art will appreciate that the grain loss selector 107 is adjusted before combining commences to set it to a loss level appropriate to the type and condition of the crop to be harvested.

I claim:

1. Apparatus for controlling the forward speed of a combine harvester in dependence upon the grain loss at a selected location in the harvester, comprising an electronic clock circuit which operates to provide an output of electrical pulses of constant duration at a constant frequency, a first control element in the clock circuit being adapted to be energized and deenergized upon initiation and termination respectively of each clock pulse, a delay circuit including a second control element adapted to be energized a predetermined time after initiation of each clock pulse and to be deenergized at the termination of each clock pulse, and an electronic counting circuit having transducer means for providing electrical output pulses representative of grain discharged in a sample of the grain loss at the selected location in the harvester, counting means supplied with pulses derived from the transducer output pulses and a third control element energized when the counting level in the counting means reaches a required value and deenergized upon termination of each clock pulse, the operation of the counting circuit being initiated at the commencement of each clock pulse and being adapted so that if before operation of the delay circuit to energize the second control element the counting level achieved by the counting circuit reaches the required value, the third control element is energized and effects operation of drive means to slow down the forward motion of the harvester until such time as the delay circuit causes energization of the second control means whereupon slowing down of the harvester forward speed is halted, whilst, if the required counting level is not reached before energization of the delay circuit the second control element is energized and causes speeding up of the harvester to occur until either the third control element is energized or the first control element is deenergized.

2. Apparatus as claimed in claim 1 wherein an adjustable grain loss selector is provided which is adapted to set said required value of the counting level in the counting means.

3. Apparatus as claimed in claim 1 wherein the transducer means in operation are located to receive thereon a sample of straw and entrained grain discharged to ground at the rear of the harvester.

4. Apparatus as claimed in claim 2, wherein grain cleaning means are provided and arranged to receive said sample of straw and entrained grain and to separate grain from straw in said sample prior to discharge of the separated grain on to the transducer means.

5. Apparatus as claimed in claim 1, wherein the transducer means in operation are located to receive straw and entrained grain discharged from the rear of the sieves of the harvester dressing shoe.

6. Apparatus as claimed in claim 1, wherein in operation, actuation of the control elements to cause variation of the forward speed of the harvester effects adjustment of a forward speed-controlling variator pulley in the harvester transmission.

7. Apparatus as claimed in claim 1, wherein the transducer means comprise a crystal microphone.